Patented Mar. 10, 1953

2,631,165

UNITED STATES PATENT OFFICE 2,631,165

PROCESS OF PRODUCING ALKALI METAL SALTS OF NITRILOTRIACETIC ACID

Ernst Ploetz, Ludwigshafen-on-the-Rhine, Germany

No Drawing. Application September 28, 1949, Serial No. 118,458. In Germany October 1, 1948

3 Claims. (Cl. 260—534)

The present invention relates to a new and useful method of producing alkali metal salts of nitrilotriacetic acid.

Whereas there exist various methods of producing the said salts it has now been found that they may be produced according to the present invention in a manner superior to any other method so far known.

It is an object of this invention to provide entirely new and valuable means of producing the alkali metal salts of nitrilotriacetic acid. It is a further object of this invention to obtain the said salts in a state in which they may be used immediately for commercial purposes, such as softening hard water.

In performing the new process, alkali metal cyanides are reacted with ammonia and formaldehyde in an alkaline medium under such conditions that the ammonia is substantially retained in the reaction medium, and after this reaction the ammonia is removed and the resulting liquid is reacted with an alkali metal cyanide and formaldehyde while heating and removing the ammonia formed during this stage of the reaction. Any alkali metal cyanides may be used for the purpose of this reaction. Whereas I prefer the use of sodium cyanide, potassium cyanide or cyanides of other alkali metals, such as lithium, may also be employed.

The first stage of the reaction as described above may be carried out either in a closed vessel or under reflux cooling. The reaction is preferably carried out at elevated temperature. The temperature range for working under normal pressure may lie between about 100° and 120° C., for working under reduced pressure, e. g. at 12 or 15 millimeters, between about 40° and 60° C. The alkali metal cyanide and the formaldehyde are employed in about equivalent amounts. The amount of ammonia, however, may be varied within wide limits. For example, the quantities employed may be between 0.1 and 3 molecular proportions calculated with respect to the alkali metal cyanide or formaldehyde respectively. As soon as the initial quantities of alkali metal cyanide and formaldehyde are completely reacted forming the corresponding alkali metal salts of amino-mono-, -di- and -triacetic acids, the reaction mixture is freed from any ammonia still present, for example by heating and, if desired, under reduced pressure. In a second stage the solution freed from ammonia is reacted with from 3 to 10 times the amounts of alkali metal cyanide and formaldehyde used in the initial stage of the reaction in such a manner that the ammonia formed by the saponification of the nitriles formed as intermediate products is removed as quickly and completely as possible, for example by carrying out the process under reduced pressure or by heating to boiling or by combining both measures. The formaldehyde is added in such a manner and under such conditions of working that it cannot react with ammonia itself. This may be effected by working at a temperature which effects the immediate escape of ammonia and water. Reduced pressure, for example a vacuum of from 10 to 200 millimeters, may also serve this purpose, the temperature being lower, for example between 40° and 60° C.

According to this new method aqueous solutions of alkali metal salts of nitrilotriacetic acid are obtained in excellent yields. They may be employed as such or, after evaporation of water, in the form of the corresponding solid salts, for example as softening agents for water.

The following examples will further illustrate how this invention may be carried out in practice. The invention, however, is not limited to these examples. The parts are by weight.

Example 1

A mixture of 366 parts of 27.8 per cent aqueous ammonia and 534 parts of a 28 per cent aqueous solution of sodium cyanide is added to 24 parts of a 50 per cent sodium hydroxide solution and then mixed with 300 parts of 30 per cent aqueous formaldehyde. After mixing the reactants, the reaction takes place under evolution of heat. It is completed while boiling the mixture for about half an hour under reflux and further heating under distilling off the vapors until the liquid no longer contains any ammonia. Then 178 parts of a 28 per cent aqueous sodium cyanide solution are added. The liquid is now heated under reduced pressure (12 millimeters) at from 40° to 60° C., and 100 parts of a 30 per cent aqueous formaldehyde solution are slowly allowed to flow drop by drop into the mixture. The liquid is then further heated for another 30 minutes at the said temperature. The addition of the amounts of sodium cyanide and formaldehyde stated above is repeated until 1070 parts of the cyanide solution and 600 parts of the formaldehyde have been added. In this manner 1800 parts of an about 36 per cent solution of the sodium salt of nitrilotriacetic acid are obtained, corresponding to a yield of about 95 per cent.

Example 2

A mixture of 197 parts of a 31 per cent aqueous potassium cyanide solution and 136 parts of 25 per cent aqueous ammonia is rendered more strongly alkaline by adding 8 parts of a 50 per cent potassium hydroxide solution. To the mixture 120 parts of 25 per cent aqueous formaldehyde are added while cooling under reflux. The mixture which initially develops heat is, after the addition of formaldehyde, boiled for an hour under reflux, then freed from ammonia by distillation and then again mixed with 197 parts of a 31 per cent potassium cyanide solution. While continuously distilling off ammonia and water, further 120 parts of a 30 per cent aqueous formaldehyde solution are allowed to flow drop by drop into the solution which is continuously kept boiling. The addition of the potassium cyanide solution and formaldehyde in the same amounts is repeated after half an hour of distillation. In this manner, 860 parts of a 30 per cent aqueous solution of the potassium salt of nitrilotriacetic acid are obtained corresponding to a yield of 84 per cent of the calculated yield.

I claim:

1. A process of producing alkali metal salts of nitrilotriacetic acid which comprises reacting an alkali metal cyanide with ammonia and formaldehyde in an alkaline medium under such conditions that the ammonia is substantially retained in the reaction medium, removing the ammonia after this reaction, and reacting the resulting liquid with an alkali metal cyanide and formaldehyde while heating and removing the ammonia as formed during this stage of the reaction.

2. A process of producing the sodium salt of nitrilotriacetic acid which comprises reacting sodium cyanide with ammonia and formaldehyde in an alkaline medium under such conditions that the ammonia is substantially retained in the reaction medium, removing the ammonia after this reaction, and reacting the resulting liquid with sodium cyanide and formaldehyde while heating and removing the ammonia as formed during this stage of the reaction.

3. A process of producing the sodium salt of nitrilotriacetic acid which comprises reacting sodium cyanide with ammonia and formaldehyde in an alkaline medium under such conditions that the ammonia is substantially retained in the reaction medium, removing the ammonia after this reaction, and reacting the resulting liquid with sodium cyanide and formaldehyde while heating and removing the ammonia as formed during this stage of the reaction under reduced pressure.

ERNST PLOETZ.

REFERENCES CITED

The following references are of record in the file of this patent:

UNITED STATES PATENTS

| Number | Name | Date |
| --- | --- | --- |
| 2,168,181 | Ulrich et al. | Aug. 1, 1939 |
| 2,407,645 | Bersworth | Sept. 17, 1946 |
| 2,461,519 | Bersworth | Feb. 15, 1949 |
| 2,500,019 | Bersworth | Mar. 7, 1950 |

OTHER REFERENCES

Polstorff et al., Ber. Deut. Chem., vol. 45, pp. 1905–1909 (1912).